United States Patent
Otto

[11] 3,826,159
[45] July 30, 1974

[54] SHARPENER ATTACHMENT FOR LAWN MOWER BLADE

[75] Inventor: Lloyd W. Otto, Springfield, Mo.

[73] Assignee: O-Max Industries, Inc., Springfield, Mo.

[22] Filed: Feb. 13, 1973

[21] Appl. No.: 331,731

Related U.S. Application Data

[63] Continuation-in-part of Ser. No. 220,874, Jan. 26, 1972, Pat. No. 3,730,023.

[52] U.S. Cl. .................................. 76/82, 76/82.1
[51] Int. Cl. ............................................ B24b 3/36
[58] Field of Search ............................... 76/82, 82.1

[56] References Cited
UNITED STATES PATENTS
3,101,629    8/1963    Koelndorfer .................. 76/82.1
FOREIGN PATENTS OR APPLICATIONS
483,124    5/1952    Canada .......................... 76/82

Primary Examiner—Leonidas Vlachos
Attorney, Agent, or Firm—Browne, Beveridge, DeGrandi & Kline

[57] ABSTRACT

For sharpening a rotary lawn mower blade of the type which moves in a horizontal plane while cutting grass clippings or the like, an attachment device for sharpening the blade when not in use; the device including a main frame which is secured to the lawn mower blade radially inwardly from the cutting edge of the latter. The main frame extends across the blade beyond the rear or trailing edge of the blade where it then extends radially outwardly in a plane offset above the plane of the blade where it terminates rearwardly of the cutting edge of the blade to be sharpened. The offset in the main frame permits attachment to conventional blades which have formed on their trailing edges, upwardly extending vanes for purposes of creating a vacuum effect during cutting. The blade cutting edge is sharpened by means of a file insert removably held in an elongated holder arm pivotally mounted to the offset portion of the main frame so that it may be oscillated to engage the file along the cutting edge of the blade to sharpen the same. The file holder arm is spring mounted to the frame by means of a bolt and slot permitting adjustment of the arm relative to the frame. Similarly through means of an elongated slot in the arm file insert may be adjusted along the latter. If desired, a brace in the form of a bolt may be attached to the offset portion of the main frame to engage the lawn mower housing to further secure the main frame against movement during a sharpening operation.

22 Claims, 8 Drawing Figures

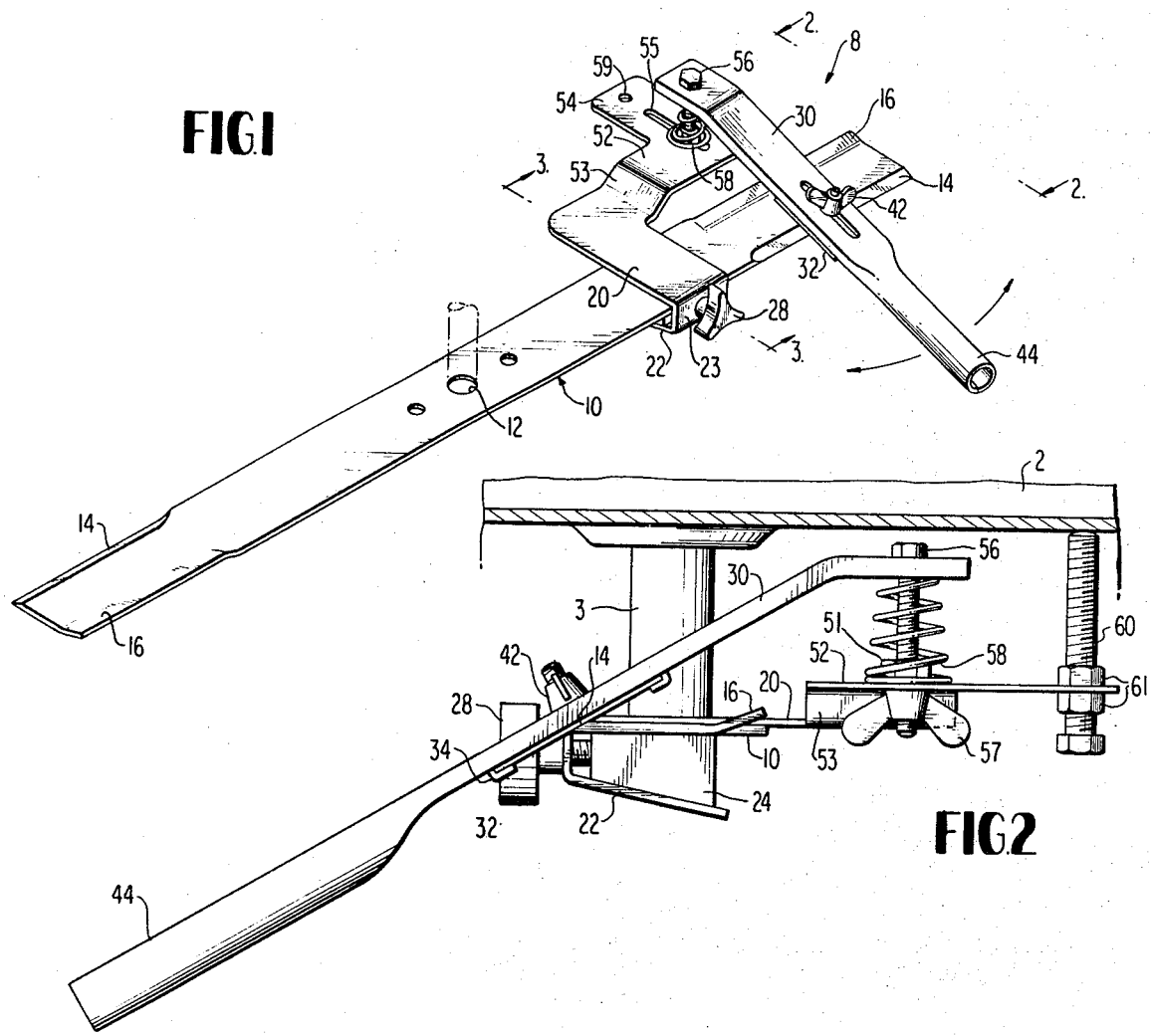
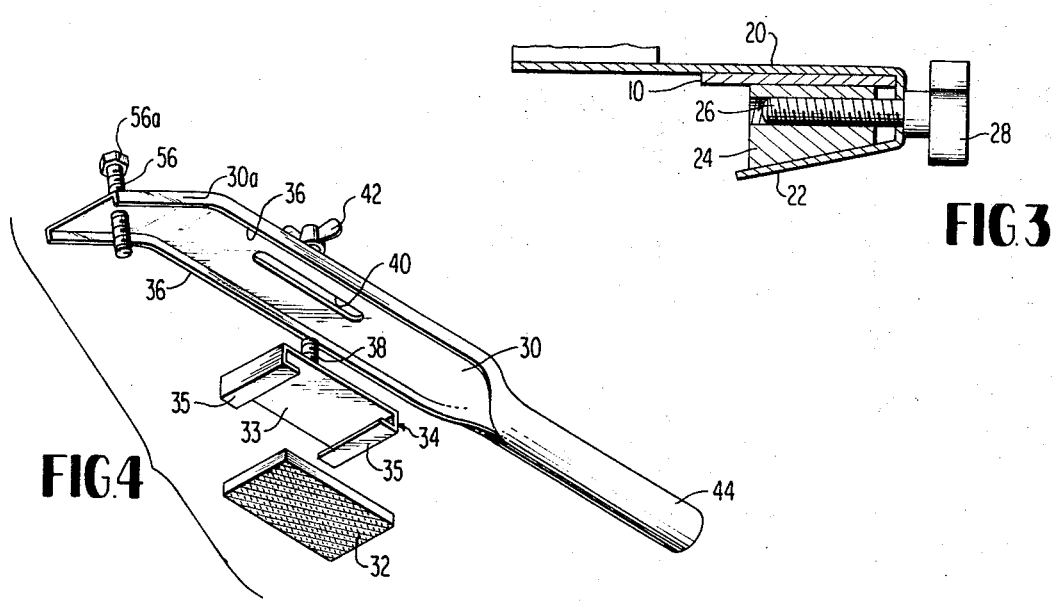

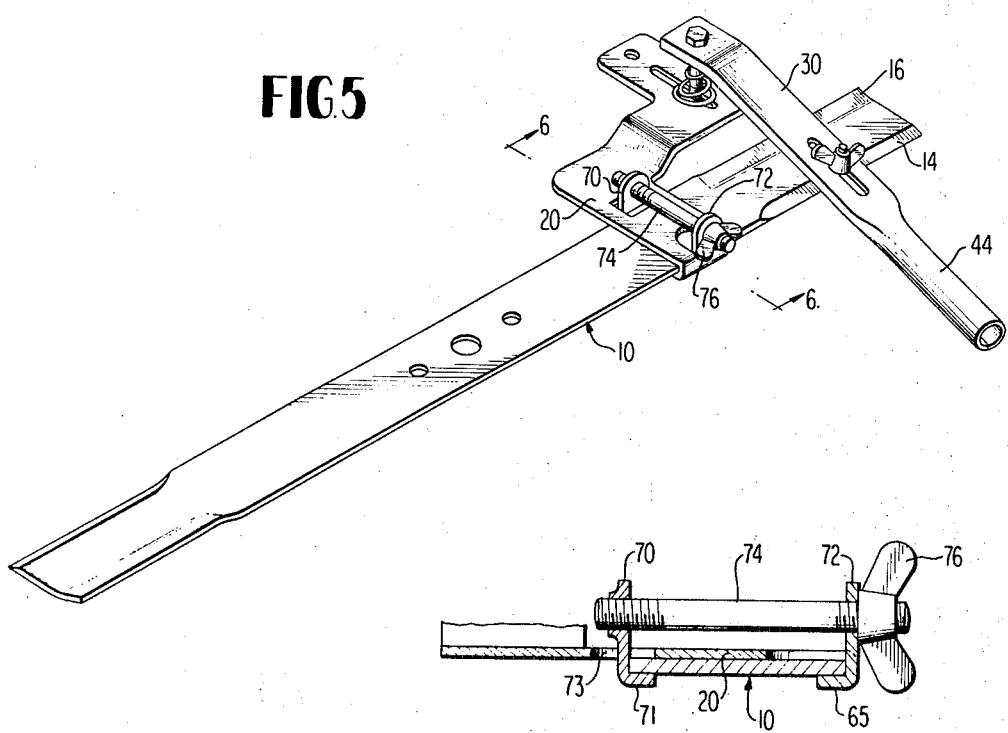
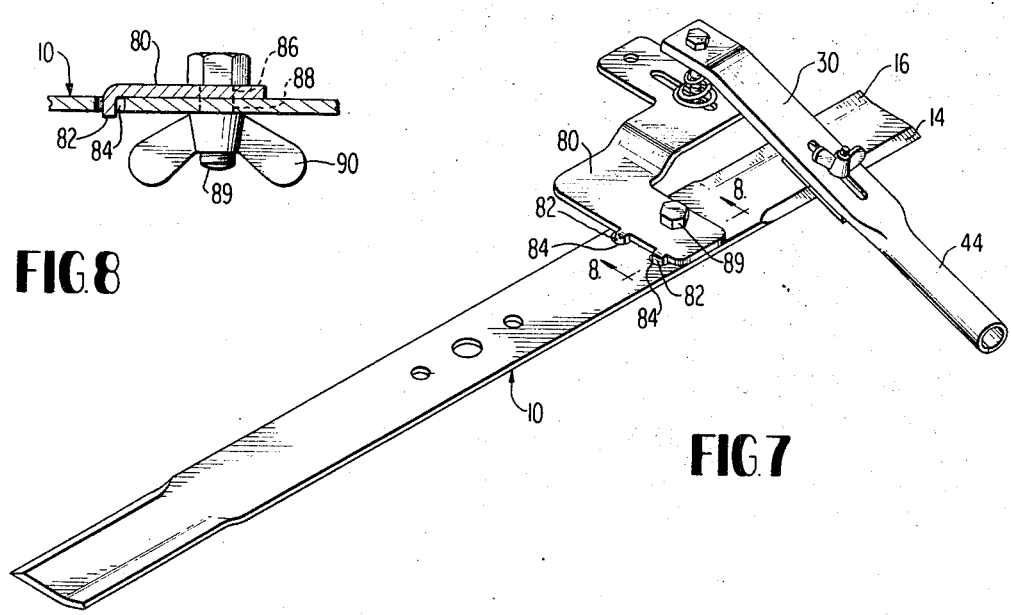

SHARPENER ATTACHMENT FOR LAWN MOWER BLADE

RELATED APPLICATION

This application is a continuation-in-part of my prior copending U.S. application Ser. No. 220,874, filed Jan. 26, 1972 and which has since issued into U.S. Pat. No. 3,730,023.

INVENTION AND OBJECTS

The present invention relates to a device which may be attached to a rotary lawn mower blade when not in use for purposes of sharpening the edges of the blade. Although the apparatus of the present invention is particularly suitable for sharpening such lawn mower blades, it is conceivable that the apparatus will have utility in connection with sharpening other blades and therefore need not be limited to the latter.

It is an object of the present invention to provide a new and improved sharpener device particularly suitable for sharpening rotary lawn mower blades of the type which rotate in a horizontal plane.

It is a further object of the present invention to provide such a sharpener device which may be used to sharpen lawn mower blades of various designs and widths including those in common use today. Included herein is a provision of such a sharpener device which may also be used without modification on conventional lawn mower blades having their trailing edges formed with upstanding vanes.

A further object of the present invention is to provide such a sharpener device which may be quickly and easily attached to a lawn mower blade and operated to effectively sharpen the cutting edge of the blade. Included herein is a provision of such a sharpener device which may also be quickly and easily removed from the blade after a sharpening operation.

A further object of the present invention is to provide such a sharpener device which may be easily adjusted to suit particular lawn mower blade designs and dimensions.

A still further object of the present invention is to provide such a sharpener device which may be employed to sharpen a lawn mower blade without any special expertise or tools and moreover which will be effective over long periods of repeated and rugged use.

Yet another object of the present invention is to provide such a sharpener device having a novel construction which may be economically manufactured on a mass production basis for retail at relatively low prices.

SUMMARY OF INVENTION

The above and other objects are achieved in a sharpener device including what may be termed as a "main frame" having a first blade mounting portion which is secured to the lawn mower blade radially inwardly of the cutting edge of the blade. In one embodiment, the blade mounting portion has a generally U-shape configuration including opposite legs which clamp across the upper and lower sides of the blade by means of a wedge mounted between the legs and operated by a screw manually actuated by a suitable knob. The lawn mower blade is received between one surface of the wedge and one of the legs while the other surface of the wedge engages the other leg. One of the legs of the blade mounting portion extends at an angle so that upon movement of the wedge in one direction along the screw, the wedge moves into wedging contact with the legs to firmly clamp the lawn mower blade between the wedge and one of the legs. In addition to the wedge, other means for securing the blade mounting portion to the blade may be employed as will be described in detail below.

The main frame further includes a file mounting portion offset above the plane of the blade and the blade mounting portion and extending in part along the direction of the blade radially outwardly from the blade mounting portion and in part rearwardly of the blade at right angles to the aforementioned part. The main frame thus in one embodiment may be categorized as having a generally Z-configuration. The file mounting portion is generally aligned rearwardly of the cutting edge portion of the blade and spaced from the trailing edge of the blade. Additionally because of the offset, the file mounting portion of the main frame clears any upwardly projecting vanes which the blade might have along its trailing edges as is very common in conventional rotary lawn mower blades today.

For sharpening the cutting edge of the blade, a portion of a file or an equivalent piece or any other insert formed of suitable hard material for sharpening a steel edge, is mounted in an elongated arm. The latter is pivotally mounted to the offset portion of the main frame for movement about a vertical axis with the file insert engaging along the cutting edge of the blade. In one embodiment, the file insert is carried by a holder having an upstanding bolt received through an elongated slot in the holder arm and secured therein by means of a wing nut received on the bolt. The elongated slot in the holder arm permits the file insert to be adjusted along the holder arm to suit the dimensions of the particular blade being sharpened.

Mounting of the file holder arm to the main frame is achieved by a bolt received through an aperture in one end of the holder arm and also through an elongated slot formed in the offset portion of the main frame. The bolt is maintained in the slot by means of a wing nut, and a coil compression spring is placed around the bolt between the main frame and the file holder arm to urge the file holder arm outwardly along the bolt.

If desired, additional support for fixing the main frame against movement relative to the lawn mower housing, may be provided by means of a bolt received through an aperture in the offset portion of the main frame so that the bolt may bear against the lawn mower housing to further secure the main frame against movement.

In use the main frame is mounted to the lawn mower blade inwardly of the cutting edge and with the legs of the main frame passing about the leading edge of the blade. The wedge is tightened to secure the main frame to the blade after which the file insert or holder arm or both are adjusted and then secured. The holder arm may then be grasped by the hand and pivoted back and forth to engage the file insert against the cutting edge to sharpen the same.

DRAWINGS

Other objects and advantages of the present invention will become apparent from the following more detailed description taken in conjunction with the attached drawings in which:

FIG. 1 is a perspective view of a sharpener device constituting one embodiment of the invention and shown mounted on a cutting blade of a rotary lawn mower;

FIG. 2 is an elevational view of the sharpener device as viewed along lines 2—2 of FIG. 1 and further including a portion of the housing of the lawn mower blade;

FIG. 3 is a cross sectional view taken generally along lines 3—3 of FIG. 1;

FIG. 4 is an exploded perspective view of a file holder arm included in the device of FIG. 1;

FIG. 5 is a view generally similar to FIG. 1 but showing a modification of the present invention;

FIG. 6 is a cross sectional view taken generally along lines 6—6 of FIG. 5;

FIG. 7 is a view similar to FIG. 1 but showing another modification of the device; and FIG. 8 is a cross sectional view taken generally along lines 8—8 of FIG. 7.

DETAILED DESCRIPTION

Referring to the drawings in detail, there is shown for illustrative purposes in FIG. 1, one embodiment, generally designated 8, of the sharpener device of the present invention which may be used on a rotary lawn mower blade generally designated 10 of the type which rotates in a horizontal plane in a housing designated 2 in FIG. 2. Rotation of the mower blade is achieved through a suitable motor or engine usually having a vertical output shaft 3 secured in an aperture 12 formed in the center of the blade. Blade 10 typically has beveled cutting edges 14 on what may be termed the leading edges of the blade since the blade rotates in the direction of the cutting edges 14 with the cutting edges 14 moving forwardly as they cut the grass. As is quite common in lawn mowers in use today, the trailing edges of the blade 10 are formed with upstanding vanes 16 to create an upward draft during the cutting operation which facilitates cutting and also conveyance of the cut clippings upwardly beyond the blade for lateral or rearward discharge from the mower housing 2.

In the embodiment shown in FIGS. 1 to 4 the sharpener device 8 includes a main frame comprised of a blade mounting portion having a generally U-shaped configuration including upper wall 20 and a lower wall 22 extending at an angle to the upper wall and being interconnected by a vertical wall or yoke portion 23. Blade mounting portion of the main frame is mounted on blade 10 with upper wall 20 overlying the surface of the blade and with lower wall portion 22 underlying the lower surface of the blade and with yoke portion 23 straddling the leading edge of the blade 10. For securing the blade mounting portion to the blade, a wedge assembly is provided including a wedge block 24 having a threaded aperture receiving a bolt 26 extending through yoke portion 23 and having an actuating knob 28 which may be easily grasped and rotated to advance or retract the wedge bolt block 24 for purposes of tightening or loosening the device on mower blade 10. The lower surface of wedge block 24 extends at an angle similar to the angle of lower wall 22 of the frame so that when wedge block 24 is retracted along screw 26 by rotating knob 28, wedge block 24 will press upon blade 10 to clamp the latter between the wedge block 24 and upper wall 20 of the frame. Extension or release of wedge block 24 by rotating knob 28 in the opposite direction will of course loosen the frame from the blade for purposes of removal which may be effected easily by laterally moving frame 20 off the leading edge of blade 10.

Actual sharpening of the cutting edge 14 of blade 10 is achieved by means of a suitable sharpening element such as a portion of a file or other sharpening material generally designated 32 which is mounted in a file holder in the form of an arm 30 mounted on the frame of the device as will be described below. Holder 30 has an elongated generally channel construction including opposite flanges 36 forming a passage for receiving a file insert carrier 34. The latter includes a flat base 33 and a pair of L-shaped flanges 35 depending therefrom for receiving and containing file insert 32 against base 33. Mounting of carrier 34 with the insert therein, in holder arm 30 is achieved through a bolt 38 upstanding from carrier 34 to be received in an elongated slot 40 formed in arm 30. Carrier insert 34 may be moved along holder arm 30 to the desired adjusted position depending on the type or dimensioning of blade 10, by means of elongated slot 40 formed in arm 30. When the desired position is achieved, a wing nut 42 received on bolt 38 of carrier 34 may be fastened securely against the top surface of holder arm 30. When received in holder arm 30, the file insert 32 is contained against longitudinal as well as transverse movement by virtue of flanges 35 of carrier 34 and flanges 36 of holder arm 30.

File holder arm 30 is mounted for pivotal movement about a vertical axis on a file mounting portion of the main frame, which includes a first portion 52 extending radially outwardly from wall 20 along the direction of and parallel to blade 10, and a second portion 54 extending at right angles to portion 52 away from the trailing edge of the blade 10. Portions 52 and 54 lie in the same plane offset above the plane of wall 20 of the blade mounting portion; they being separated by a stepped portion 53. This offset is made of a sufficient distance to enable the frame to clear the upstanding vanes 16 on the trailing edge of the blade. Additionally, offset portion 52, 54 is dimensioned so that the portion 54 will be located rearwardly in general alignment with the cutting edge portion 14 of blade 10.

File holder 30 is mounted to frame portion 54 by means of an elongated slot 55 which receives a bolt 56 passing through an aperture in the forward portion of arm 30; a wing nut 57 being employed to maintain bolt 56 in slot 55 of frame portion 54. To resiliently urge holder arm 30 upwardly away from frame portion 54 a compression coil spring 58 is provided about bolt 56 between holder arm 30 and frame portion 54 as shown in the drawings; the head 56a of bolt 56 acting as a stop for holder arm 30. Slot 58 in frame portion 52 permits bolt 56 to be adjusted along arm 30 to suit the particular dimensions or characteristics of blade 10. Once adjusted, wing nut 60 may be secured to maintain bolt 56 in proper position. The length of bolt 56 above frame portion 54 may be adjusted by loosening wing nut 57 so that arm 30 will extend downwardly therefrom at a suitable angle or incline for effective sharpening of edge 14. In the specific embodiment shown, the forward portion 30a of arm 30 is formed at a slight angle in order to obtain the desired angular disposition of arm 30 as well as to minimize the distance of projection of arm 30 above frame 54 in view of the limited space in the mower housing above the blade 10. Additionally, in the preferred embodiment a stabilizer nut 51 is mounted in slot 55 to receive bolt 56 as shown in FIG. 2. When wing nut 57 is loosened, nut 51 may be slid along slot 55 to adjust the position of bolt 56. When the desired position of bolt 56 is reached, wing nut 57 is merely tightened to clamp frame portion 52 and stabilize bolt 56 relative thereto.

If desired frame portion 54 may be provided with an aperture 59 for mounting a brace 60 thereto for securing the frame against movement relative to the mower housing during a sharpening operation as shown in FIG. 2. Brace 60 may take the form of a threaded bolt secured to frame portion 54 by nuts 61 with the top of bolt 60 firmly engaged against the underside of the mower housing 2 as shown in FIG. 2.

In use, legs 20 and 22 are slipped transversely over the lawn mower blade 10 at a location spaced radially inwardly from the cutting edge 14 to be sharpened and the opposed vane 16 as shown in FIG. 1. The position of file holder arm 30 relative to the frame may then be adjusted by moving pivot stud 56 along slot 55. The angle of inclination of the holder arm which will determine the bevel to be formed on the cutting edge, may then be adjusted by advancing or retracting wing nut 57 along pivot stud 56. If necessary, the position of file insert 32 may be adjusted along arm 30 to properly overlie the cutting edge 14, by means of wing nut 42. Having properly adjusted the device, the user may simply grasp the holder arm and pivot it back and forth about stud 56 (as illustrated by the arrows in FIG. 1) to engage the file insert 30 with the cutting edge 14 of the blade to sharpen the same. In the referred embodiment, the free end portion of holder arm 30 has its edge portions rolled inwardly at 44 to form a smooth handle for manipulating the arm during a sharpening operation.

Referring now to FIGS. 5 and 6 there is illustrated a modification of the device described above wherein instead of employing the aforedescribed wedge assembly for securing the frame 20 to the blade, the frame is formed at one end with an L-shaped reentrant portion 65 which underlies and engages the underside of mower blade 10 as shown in FIG. 6. The other end of the frame 20 is secured to blade 10 by an L-shaped piece including an upstanding tab portion 70 and a lower shelf portion 71 which underlies and engages the opposite edge portion of blade 10 as shown in FIG. 6.

Frame 20 is formed with a slot 73 which receives tab portion 70. A similar tab 72 is integrally formed on frame 20 to be interconnected with tab portion 70 by means of a bolt 74 having threads on one end received in a threaded passage formed in tab portion 70. The other end of bolt 74 is received through a passage in tab 72 and secured by a wing nut 76 as shown in FIG. 6. If desired, and although not shown, tab 72 and reentrant portion 65 may be made separate from frame 20 and inserted through an end slot in frame 20 to engage the leading edge of the blade. In any event, it will be seen that by tightening wing nut 76 on bolt 74, mower blade 10 will be secured between frame 20 and portions 65 and 71. Other than the latter modification, the device is the same as that described above.

In FIGS. 7 and 8 another modification of the device pertaining to the attachment means for securing the frame to the blade is illustrated. In this modification, the blade mounting portion includes a single leg 80 adapted to be secured transversely across the cutting blade by means of tabs 82 fixed to the leg 80 and extending through apertures 84 formed in the cutting blade. The leg is secured to the blade by means of a nut and bolt assembly 89 and 90; the bolt passing through apertures 86 and 88 formed in the leg and blade, respectively.

It will be seen from the above that not only is the device of the present invention highly versatile in being adjustable to different cutting blade types and sizes, with or without upstanding vanes, but also it may be mounted to either side of the blade depending on the location of the bevel.

What is claimed is:

1. A device adapted to be attached to a lawn mower blade to sharpen the same, the blade being of the type having cutting edges on the opposite leading edges thereof and raised vane portions on the opposite trailing edges thereof positioned opposite the cutting edges, respectively; the device comprising: a frame including a first portion, means for removably securing said first portion of the frame to a lawn mower blade at a location spaced radially inwardly from the cutting edge and vane on one end portion of the blade, said frame including a second portion offset in a plane above said first portion so as to clear the vane of the cutting blade when the first portion is secured thereto, said second portion being dimensioned to extend to an area located in general alignment with the cutting edge to be sharpened in a direction extending transversely of the cutting blade when the first portion is secured to the cutting blade in the position aforesaid, and file means mounted to said second portion for movement along the cutting edge to sharpen the same.

2. The device defined in claim 1 wherein said second portion of the frame is spaced from the trailing edge of the blade when the first portion is secured to the blade in the position aforesaid.

3. The device defined in claim 1 wherein said first portion of the frame includes a leg engaged across one side of the blade.

4. The device defined in claim 3 wherein said second portion of the frame lies in a plane generally parallel to said first portion of the frame.

5. The device defined in claim 4 wherein said second portion of the frame is spaced rearwardly of the cutting edge of the blade when the first portion is mounted thereto in the position aforesaid.

6. The device defined in claim 1 wherein said second portion has an elongated slot extending in the transverse direction of the blade when the frame is secured thereto, and wherein there is included a pivot in said slot connected to said file means for mounting the same for pivotal movement relative to the frame, said slot permitting the position of the file means to be adjusted relative to the frame and the cutting table when the frame is secured thereto.

7. The device defined in claim 6 wherein said file means includes an elongated holder arm, an insert carrier mounted in said arm, and a file insert received in said carrier, and wherein there is further included means for adjusting the position of the insert carrier along the arm.

8. The device defined in claim 7 wherein there is further included spring means mounted about the pivot between the second portion of the frame and the holder arm urging the holder arm outwardly along the pivot.

9. The device defined in claim 1 wherein said means for attaching the first portion of the frame to the blade includes a wedge means.

10. The device defined in claim 9 wherein said first portion of the frame includes a pair of legs adapted to receive the blade to be sharpened with the legs positioned on opposite sides thereof, said wedge means includes a wedge member being located between said legs with the blade positioned between the wedge member and one of said legs, and means mounted to the frame for moving the wedge member for securing or releasing the blade relative to the legs.

11. The device defined in claim 1 wherein said means for removably securing said first portion of the frame includes at least one tab projecting downwardly from the frame for receipt through an aperture in the lawn mower blade, and fastener means securing the frame to the blade.

12. The sharpener device defined in claim 1 wherein said means for removably securing said first portion of the frame to the lawn mower blade includes a plate member adapted to underlie the blade on the side opposite the frame portion, and fastening means for securing the frame portion and the plate to the blade.

13. The device defined in claim 12 wherein said fastening means includes a first tab projecting upwardly from the plate, a second tab fixed to the frame and projecting upwardly therefrom, and a fastener element interconnecting the tabs.

14. A sharpener device adapted to be attached to a cutting blade for sharpening the same, the device comprising in combination: a frame including a pair of legs in underlying and overlying relationship with each other adapted to receive therebetween a cutting blade with the legs extending in the transverse direction of the cutting blade, wedge means including a wedge mounted to the frame and located between said legs for securing and releasing the legs relative to the cutting blade, and means including blade sharpening material mounted for oscillatory movement to the frame for engagement with the cutting edge of the blade to sharpen the same when the legs are secured to the blade.

15. The device defined in claim 11 wherein one of said legs extends at an angle to the other leg, and wherein said wedge means includes a screw mounted in the frame and received in said wedge to advance or retract the wedge along the screw to loosen or fasten the blade between the wedge and one of the legs.

16. A sharpening device adapted to be attached to a cutting blade for sharpening the cutting edge thereof; the device comprising in combination: a frame, securement means for releasably securing the frame to a blade to be sharpened, a holder arm, first means mounting the holder arm to the frame for pivotal movement relative thereto, a sharpening member, second means mounting the sharpening member to said holder arm for engaging the cutting edge of the blade for sharpening the same upon pivotal movement of the holder arm, one of said first and second means including an elongated slot for adjusting the position of one of said holder arm and sharpening member and wherein said securement means includes a clamping plate underlying said frame, and fastener means for securing said frame and plate to the blade on opposite sides thereof.

17. The device defined in claim 16 wherein said fastener means includes a first tab projecting upwardly from said plate, a second tab projecting upwardly from the frame and a fastener element interconnecting said tabs.

18. A sharpening device adapted to be attached to a cutting blade for sharpening the cutting edge thereof; the device comprising in combination, a frame, securement means for releasably securing the frame to a blade to be sharpened, a holder arm, first means mounting the holder arm to the frame for pivotal movement relative thereto, a carrier mounted on the arm or slidable movement therealong to a desired adjusted position, sharpening material received in said carrier for engaging the cutting edge of the blade for sharpening the same upon pivotal movement of the holder arm, means for releasably securing the carrier to the holder arm in adjusted position including an elongated slot formed in one of said holder arm and carrier, a stud fixed to the other of said holder arm and carrier and received through said slot, and a fastener element received on said stud.

19. The device defined in claim 18 wherein said holder arm has a pair of laterally spaced elongated flanges received in said carrier and for guiding the same during adjusting movement of the carrier, and wherein said carrier has flange means for movably receiving therein said sharpening material.

20. A sharpening device adapted to be attached to a cutting blade for sharpening the cutting edge thereof; the device comprising in combination: a frame, securement means for releasably securing the frame to a blade to be sharpened, a holder arm, first means mounting the holder arm to the frame for pivotal movement relative thereto, a sharpening member, second means mounting the sharpening member to said holder arm for engaging the cutting edge of the blade for sharpening the same upon pivotal movement of the holder arm, one of said first and second means including an elongated slot for adjusting the position of one of said holder arm and sharpening member and wherein said first frame is dimensioned to extend transversely across the blade to be sharpened and wherein said securement means includes at least one tab projecting from said frame to be received through an aperture in the blade to be sharpened, and fastener means for securing the frame to the blade.

21. A sharpening device adapted to be attached to a cutting blade for sharpening the cutting edge thereof; the device comprising in combination: a frame, securement means for releasably securing the frame to a blade to be sharpened, a holder arm, first means mounting the holder arm to the frame for pivotal movement relative thereto, a sharpening member, second means mounting the sharpening member to said holder arm for engaging the cutting edge of the blade for sharpening the same upon pivotal movement of the holder arm, one of said first and second means including an elongated slot for adjusting the position of one of said holder arm and sharpening member and wherein said frame includes opposed leg portions and said securement means includes a wedge mounted to said frame and received between said legs.

22. A sharpening device adapted to be attached to a cutting blade for sharpening the cutting edge thereof; the device comprising in combination: a frame, securement means for releasably securing the frame to a blade to be sharpened, a holder arm, first means mounting the holder arm to the frame for pivotal movement relative thereto, a sharpening member, second means mounting the sharpening member to said holder arm for engaging the cutting edge of the blade for sharpening the same upon pivotal movement of the holder arm, one of said first and second means including an elongated slot for adjusting the position of one of said holder arm and sharpening member, and wherein said first means includes a pivot stud received through said arm and said frame, and spring means between said arm and frame urging said arm outwardly along said pivot stud, and wherein said first means includes said elongated slot which is in said frame and receives said pivot stud.

* * * * *